United States Patent Office 3,203,934
Patented Aug. 31, 1965

3,203,934
PROCESS FOR PREPARING INSOLUBLE, SULFUR-CONTAINING POLYAMIDES
Heino Wellens and Ludwig Orthner, Frankfurt am Main, and Karl Horst, Hofheim, Taunus, Germany, assignors to Farbwerke Hoechst Aktiengesellschaft vormals Meister Lucius & Brüning, Frankfurt am Main, Germany, a corporation of Germany
No Drawing. Filed May 24, 1962, Ser. No. 197,272
Claims priority, application Germany, May 27, 1961,
F 34,034
6 Claims. (Cl. 260—78)

It is known to prepare alkyl-thiosulfuric acids which contain amido groups by reacting amino-alkyl-thiosulfuric acids in an alkaline medium with acylating agents. It is further known to prepare bis-functional "Bunte"-salts (i.e. organic polythiosulfates) which contain amido groups from bis-halogeno-acylamides, bis-halogeno-alkyl ureas or urethanes or bis-halogeno-alkyl-disulfonamides. The "Bunte"-salts can be reacted, for example, with alkali metal sulfides, to form polyamides which are capable of being spun and which are obtained in the form of a powder or of flakes.

Now, we have found that there can be prepared insoluble, resinous polycondensation products which are cross-linked by polysulfide bridges, by reacting (A) aliphatic, cycloaliphatic or aromatic dicarboxylic acids, or the functional derivatives thereof, with (B) polyalkylene polyamines that contain at least 3 primary or secondary amino groups, to form basic polyamides, and introducing into these polyamides in known manner for each mol at least 3 residues that carry an interchangeable halogen atom, converting the compounds (C) thus obtained by reacting them with water-soluble inorganic thiosulfates (D) into "Bunte"-poly-salts (E) and cross-linking these compounds in the presence of alkaline condensation agents according to the conventional methods known for the cross-linking of such compounds.

As dicarboxylic acids (A) for preparing the basic polyamides to be used according to the present invention, there may be used any aliphatic, cycloaliphatic or aromatic dicarboxylic acid which contains at least 6 carbon atoms; in particular, there may be use dicarboxylic acids having a molecular weight in the range of 146 to about 650. Examples of such suitable dicarboxylic acids are saturated aliphatic dicarboxylic acids, aliphatic dicarboxylic acids whose carbon chain is interrupted by carbocycles and/or by groups of hetero-atoms, especially aliphatic dicarboxylic acids containing in the molecule up to 3 ether oxygen atoms or carbonamide groups, and/or carbocycles, such as cyclohexane, benzene, naphthalene or phenol ether radicals, further aromatic dicarboxylic acids, especially benzene-dicarboxylic acids and naphthalene-dicarboxylic acides. Representatives of suitable dicarboxylic acids are, for example, adipic acid, pimelic acid, suberic acid, azelaic acid, sebacic acid, decane-dicarboxylic acid, dimerized fatty acids with about 32 up to 40 carbon atoms, further dicarboxylic acids containing cabonamide groups in the chain, for example, the dicarboxylic acid of the formula

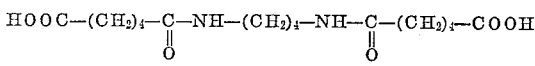

dicarboxylic acids whose chain is interrupted ether-like by oxygen atoms, for example, triglycol-dicarboxylic acid, as well as dicarboxylic acids whose chain is interrupted by aromatic or cycloaliphatic rings, for example, α,ω-xylylene-dicarboxylic acid, diphenylol-propane-diacetic acid, further aromatic and cycloaliphatic dicarboxylic acids such as phthalic acid, terephthalic acid, 1,4-phenylene-dicarboxylic acid, isophthalic acid, naphthalic acid, naphthalene-1,4-dicarboxylic acid, cyclohexane-dicarboxylic acid. Functional derivatives of these dicarboxylic acids, which are used preferably, are, for example, esters, anhydrides, and dihalides of these acids. As dicarboxylic acid esters, there enter into consideration in the first instance diesters with low molecular monohydric alcohols, preferably those which contain 1 to 4 carbon atoms. As dicarboxylic acid halides, there are preferably used the chlorides or bromides. There may also be used mixtures of various dicarboxylic acids or their derivatives.

As polyalkylene-polyamines (B) to be used in the reaction with dicarboxylic acids for preparing the basic polyamides, there may be used polyalkylene-polyamines which contain at least 3 to about 12, preferably 3 to 6, primary or secondary amino groups and the alkylene groups of which have 2 to 4 carbon atoms. There may also be used polyalkylene-polyamines which contain different alkylene groups in their molecule. The polyalkylene-polyamines which enter into consideration correspond to the general formula

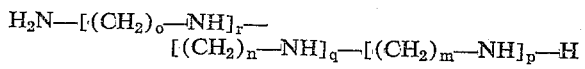

in which $n$, $m$ and $o$ each represent an integer from 1 to 4, $p$ represents an integer from 1 to 6, and $q$ and $r$ each stand for a value from 0 to 6, the sum of $p$, $q$ and $r$ being at least equal to 2. Examples of such polyalkylene-polyamines are: diethylene-triamine, dipropylene-triamine, dibutylene-triamine, triethylene-tetramine, tripropylene-tetramine, tetraethylene-pentamine, pentaethylene-hexamine, and diethylene-dipropylene-pentamine.

For preparing the basic polyamides, the dicarboxylic acids or their esters or anhydrides are condensed with the polyalkylene-polyamines at temperatures in the range of about 100 and 210° C. The condensation degree to be maintained can vary within wide limits. Depending on the duration of the condensation reaction and on the condensation temperature, there can be obtained products with relatively low molecular weights, for example, about from 800 to 1000, or also high molecular weight products having molecular weights ranging, for example, from about 3000 to 10,000. The degree of condensation can be calculated from the quantity of water or alcohol separated off, taking into consideration the ratio of the quantities of starting components chosen. When dicarboxylic acid halides are used, it is preferred to dissolve the polyalkylene-polyamines in water or in alcohol and then slowly to introduce the dicarboxylic acid halide, while stirring, at a temperature in the range of 0 and 40° C. The hydrogen halide thereby liberated is bound by continuous addition of an alkali metal hydroxide or an alkali metal carbonate. The molecular ratio of the dicarboxylic acids or of the functional derivatives to the polyalkylene-polyamines is generally kept in the reaction at a ratio from 1.8:1 to 1:2, i.e. from about 0.55 up to 2 mols of polyamine are used for each mol of dicarboxylic acid or of a derivative thereof. Preferably, the molecular ratio is kept at 1:1.

As radicals which contain an interchangeable halogen atom and which are to be introduced into the basic polyamides, there enter into consideration radicals corresponding to the formulae

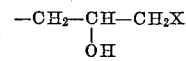

and

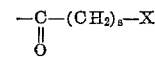

in which X represents a halogen atom, in particular a chlorine or a bromine atom, and $s$ stands for an integer from 1 to 3. The introduction of the radicals which contain the interchangeable halogen atom is carried out according to known methods by reacting the basic polyamides with epihalohydrins, dihalohydrins or $\alpha,\beta$- or $\gamma$-halogeno-carboxylic acid halides such as chloroacetyl chloride, chloropropionyl chloride, or chlorobutyryl chloride.

In general, there are introduced about 3 to about 50, preferably 10 to 30, radicals with interchangeable halogen atom per each molecule of basic polyamide. For the introduction, the basic polyamides are dissolved in water, in a water-miscible low molecular weight aliphatic alcohol or in a mixture of water and alcohol, then the epihalohydrin, dihalohydrin or halogen-carboxylic acid halide is added in the quantity, calculated to be necessary for introducing the desired number of halogen atoms, or in a slight excess quantity, and the whole is then stirred at a temperature in the range of 0 to 100° C. until reaction is complete. Generally, the reaction is complete after about 1 to 5 hours. When a dihalohydrin or a halogeno-carboxylic acid halide is used, it is preferred to keep the reaction mixture at a pH value of between 7 and 10 by adding alkalies. The aqueous, alcoholic or aqueous-alcoholic solution or dispersion of the reaction product (C) thus obtained can directly be used for the further reaction with water-soluble thiosulfates (D).

For the reaction with the water-soluble inorganic thiosulfate (D), the polyamides (C), which carry at least 3 radicals with interchangeable halogen atoms and which may also be used as mixtures and which are obtained in the form of solutions, emulsions or suspensions in water-soluble lower aliphatic alcohols, preferably methanol, ethanol or isopropanol, water or in mixtures of water and the aforesaid alcohols, are mixed with the aqueous solution of an inorganic thiosulfate, preferably an alkali metal thiosulfate, and then reacted, totally or partially, to form "Bunte"-salts. At least 3 thio-sulfate groups must be introduced for each molecule of polyamides (C) used. In the reaction, the thiosulfonic acid salts are used in the quantity found to be necessary for introducing the desired number of thiosulfate groups, or in a slight excess quantity. The reaction is generally carried out at temperatures in the range of about 40 and 100° C., while stirring, and is generally terminated after about 1 to 10 hours.

The "Bunte"-poly-salts (E) thus obtained are then reacted in an aqueous, alcoholic or in an aqueous/alcoholic solution at a temperature in the range of 0 and about 130° C., in the presence of alkaline condensation agents, with formation of polysulfide bridges, to form novel, water-insoluble condensation products having properties which differ according to the type of starting material used and to the number of thiosulfate groups introduced. The condensation temperature to be maintained depends, in the first instance, on the selected alkaline condensation agent. In general, the condensation temperature is kept in the range of about 40 to about 110° C. The quantity of alkaline condensation agent to be added depends on the nature of the condensation agent and must be so chosen that the mixture has a pH value of at least 8 to about 14.

As alkaline condensation agents, there may be used any inorganic or organic base which is suitable for adjusting the required pH value of 8–14. There may be used, for example, alkali metal hydroxides, ammonium hydroxide, and alkaline earth metal hydroxides, alkali metal carbonates and alkali metal bicarbonates, alkali metal sulfides, ammonium sulfide, alkali metal hydrogen sulfides, and alkali metal polysulfides, further organic nitrogen-containing bases such as alkylamines and the corresponding quaternary ammonium compounds, alkanolamine, basic heterocyclic compounds such as pyridine, piperidine, piperazine, and morpholine, as well as the alkali metal salts of weak organic acids, especially sodium acetate or potassium acetate, and the sodium salt or potassium salt of trichloroacetic acid. There may also be used mixture of various alkaline condensation agents. When weak basic substances are used, for example, morpholine, piperidine, or alkali metal bicarbonates, the condensation is advantageously carried out at elevated temperatures of about 100° C. or more. When strong alkalies are used, for example, alkali lyes, lower temperatures, for example, temperatures in the range from about 40 to about 80° C., are generally sufficient.

The condensation of the "Bunte"-salts can be accelerated by the addition of small quantities of reducing agents, for example, alkali metal sulfites or alkali metal dithionites. When alkali metal sulfides, alkali metal hydrogen sulfides or alkali metal hydrogen polysulfides are used as alkaline condensation agents, condensation starts very soon, in most cases already at a temperature of 40° C. The condensing action of, for example, alkali metal carbonates can be accelerated by the addition of thio-urea.

The condensation products containing polysulfide bridges, which are obtained by the process of the present invention, are suitable, for example, for preparing plastic masses or coatings, for the finishing of textiles or as insulating material. In general, the products obtained by the process of the present invention constitute transparent, plastic masses having a flexible to hard consistency.

By variation of the dicarboxylic acids and of the polyalkylene polyamines used as starting substances, and by introduction of different residues containing the interchangeable groups in varying amounts, the properties of the substances prepared can be modified. In particular, it is possible to gradually modify the flexibility of the products to make them suit any particular application. Very noteworthy is also the considerable difference in the flexibility and elasticity of the products, with polysulfide bridges in the polyamide chain, obtained, for example, from organic thiosulfuric acid, especially bis-thiosulfuric acid, by the proces described in German Patent 928,733, and the products of the present invention which are prepared from basic polyamides and which already have a considerable condensation degree and in which the thiosulfate groups which form the polysulfide bridges are located in side chains. The products described in German Patent 928,733 are obtained in the form of powders or hard thermosetting scales, whereas the products of the present invention are obtained in the form of coherent, flexible to rubber-elastic masses.

In uncondensed state, the "Bunte"-salts (E) prepared by the process of the present invention can be used with particular advantage as binding agents for the fixation of pigments on textile materials and foils. When used for such applications, the "Bunte"-poly-salts (E) are added to the preparations, for example, printing pastes or padding liquors which contain pigments and, if necessary, also other usual auxiliary agents. In addition thereto, it is advantageous when the printing pastes or the padding liquors contain also polyalkylene-polyamides and, if desired or required, also alkali metal sulfides, alkali metal hydrogen sulfides, alkali metal hydrogen polysulfides, thiourea, compounds which contain organic mercapto groups, organic disulfide compounds or derivatives of the thiocarbamic acid. Fixation of the goods printed or padded with these preparations is carried out by heating the goods with alkalis, generally at a temperature in the range of 60 and 200° C. The fixation with alkalis can be carried out, for example, by passing the goods that have been printed or padded and then dried through a bath of alkaline treating agents, at 60–100° C. It is also possible to add to the printing paste or to the padding liquors alkaline agents or compounds that form alkalis on heating such as sodium bicarbonate or the sodium salt of trichloroacetic acid. In this case the fixation can be effected by steaming or by dry heating to a temperature in the range of 90–200° C.

The following examples illustrate the invention but they are not intended to limit it thereto:

Example 1

294 g. of azelaic acid diethyl ester and 135 g. of dipropylene-triamine were heated, while stirring, to a temperature in the range of 140–180° C. until 92 g. of ethanol had separated. The basic polyamide formed was diluted in 300 g. of ethanol and mixed, while being stirred, at 30° C. with 100 g. of epichlorohydrin. Stirring was continued for 3 hours at a temperature in the range of 30–50° C., and 300 cc. of water and 280 g. of sodium thiosulfate dissolved in 200 cc. of water were added. The solution was adjusted to a pH of 8.5 by means of dilute sodium hydroxide solution and heated to 50° C., while stirring. After a short period, the sodium hydroxide solution which was then liberated continuously was neutralized by the addition of hydrochloric acid of 10% strength in order to prevent the pH value from rising above 9.5. As soon as the pH-value remained constant, the whole was heated to boiling under reflux during 20 minutes.. The alcohol was then distilled off and the solution of "Bunte"-poly-salts was made up so as to contain 40% by weight of salt. Yield: 1280 g. of solution.

20 g. of the solution thus obtained and 5 cc. of a sodium hydroxide solution of 10% strength were heated to 70–80° C. for 5 minutes. After drying, there was obtained an elastic, transparent, insoluble resin.

Example 2

372 g. of dicarboxylic acid ester prepared by condensation of 2 mols of adipic acid dimethyl ester and 1 mol of tetramethylene diamine, were heated together with 110 g. of diethylene-triamine at 150–190° C. until 64 g. of methanol had separated. This basic polyamide was dissolved in 1.5 liters of ethanol and reacted at 40–50° C. with 100 g. of epichlorohydrin. The reaction was terminated after 4 hours. The solution was then diluted with 500 cc. of water and 280 g. of sodium thiosulfate dissolved in 200 cc. of water were added thereto. The mixture was then adjusted to a pH-value of 9 with a sodium hydroxide solution and heated to 50° C. The gradually liberated sodium hydroxide was neutralized with hydrochloric acid of 10% strength, to maintain a pH-value of 9.0 to 9.5. After 1½ hours, the whole was heated, during 30 minutes, to boiling under reflux and then the methylalcohol was removed by evaporation under reduced pressure. The solution of "Bunte"-polysalts was made up by adding water to contain 2150 g.

20 g. of the solution thus prepared were heated at 40° C. for 3 minutes with 5 cc. of sodium sulfide solution of 5% strength. Thereby an insoluble resin was formed which showed a rubber-like elasticity and which became transparent after drying. In similar manner, there may be obtained resins from the solutions prepared according to the methods described in the Examples 4 and 5.

Example 3

194 g. of isophthalic acid dimethyl ester together with 140 g. of dipropylene-triamine were heated to 140–190° C. until 64 g. of methanol had separated. The reaction product was then dissolved in 700 cc. of isopropanol of 60% strength. 135 g. of β-chloropropionyl chloride were added dropwise in the course of 1½ hours at 0° C. The solution was always kept in the weakly alkaline range by adding sodium hydroxide solution of 10% strength and, after termination of the dropwise addition, it was stirred for 1 hour at 15° C. 270 g. of thiosulfate in 180 cc. of water were then added and the mixture was heated to boiling while stirring, until all the chlorine had separated in the form of ions. The solution was then freed from alcohol and the residue was made up with water to a weight of 920 g.

To 20 g. of the solution thus prepared there were added 5 cc. of a solution of 5% strength of sodium polysulfide. The solution solidified after a few minutes and water separated after a further few minutes. After drying, there was obtained a tough, flexible but not elastic resin.

Example 4

232 g. of a dicarboxylic acid dimethyl ester, prepared by the condensation of 1 mol of hexamethylenediamine and 2 mols of triglycolic acid dimethyl ester, together with 60 g. of dipropylene-triamine were heated to 150–200° C. until 32 g. of methanol were split off. The reaction product was then dissolved in 800 cc. of a mixture of 100 cc. of glycolmonomethyl ether, 400 cc. of ethanol and 300 cc. of water. 58 g. of chloroacetyl chloride were then added dropwise in the course of 1 hour at 0° C., and the mixture was always kept in the weakly alkaline range by adding sodium hydroxide solution of 10% strength. After termination of the dropwise addition, stirring was continued for 1 hour at 10 to 20° C. A solution of 135 g. of sodium thiosulfate in 80 cc. of water was added and the whole was heated to boiling under reflux until the solution showed no turbidity upon dilution with water. The alcohols were then distilled off, the remainder was made up with water to a weight of 920 g.

20 g. of the solution thus prepared were mixed with 5 cc. of a solution of 5% strength of sodium polysulfide. The solution solidified after some minutes and separated water after a further few minutes. After drying, there was obtained a tough, flexible but not elastic resin.

Example 5

624 g. of a commercial dimerized oleic acid ethyl ester together with 188 g. of tripropylene-tetramine were heated to 140–200° C. for so long until 92 g. of ethanol had separated. The polyamide was then dissolved in a mixture of 1.5 liters of isopropanol and 50 cc. of water, 184 g. of epichlorohydrin were added during 1 hour at 30° C. and the solution was kept for further 2 hours at 30° C. and for 1 hour at 50° C. 550 g. of sodium thiosulfate, dissolved in 400 cc. of water, were added and the whole was stirred at 60° C. until a sample showed only slight turbidity upon addition of double the quantity of water. The precipitated common salt was removed by filtration and the alcohol was distilled off. The residue was made up to a weight of 3670 g.

20 g. of the solution thus prepared were mixed with 5 cc. of a solution of 5% strength of sodium polysulfide. The solution solidified after some minutes and separated water after a further few minutes. After drying, there was obtained a tough, flexible, almost rubber-elastic resin.

Example 6

133.2 g. of phthalic acid anhydride (0.9 mol) together with 159 g. (1 mol) of dibutylene triamine were heated to 130–180° C. until about 0.9 mol of water had separated off. The basic polyamide thus formed, which had a molecular weight of about 4000, was then dissolved in 300 cc. of ethanol and, after addition of 50 cc. of water, it was successively reacted according to the method described in Example 1, with 100 g. of epichlorohydrin and 260 g. of thiosulfate dissolved in 260 cc. of water.

20 cc. of the solution of 40% strength thus prepared, together with 3 cc. of piperidine, were then heated to boiling under reflux for 30 minutes. After filtering, washing and drying, there was obtained a transparent, resilient resin which was found not to be soluble in water nor in organic solvents.

Example 7

344 g. of diphenylol-propane-diacetic acid having the formula

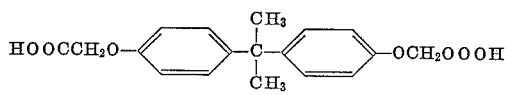

together with 110 g. of diethylene triamine were heated during 2 hours to 135° C. and then at 170–190° C. until a total of 37 g. of water had separated. The basic polyamide thus prepared was dissolved in 500 cc. of methanol and reacted, according to the method described in Example 1, successively with 100 g. of epichlorohydrin and 260 g. of thiosulfate dissolved in 100 cc. of water. The solution was subsequently made up to a content of 33% of solid substances by dilution with water. 50 cc. of this solution together with a solution of 5 g. of potassium carbonate and 0.2 g. of sodium dithionite in 25 cc. of water were heated for 20 minutes to 80° C. After filtration, washing and drying of the precipitated mass, there was obtained a flexible, sparingly elastic, insoluble plastic.

*Example 8*

To a solution of 160 g. of N,N'-bis-(β-aminoethyl)-propylene-diamine in 840 cc. of water was added, while stirring, at 0–10° C. and during about 3–4 hours, a solution of 252 g. of naphthalene-1,4-dicarboxylic acid chloride in 600 cc. of benzene, the pH value being maintained at between 8–9.5 by adding a total of 400 cc. of sodium hydroxide solution of 20% strength. After termination of the addition, stirring was continued, while slowly increasing the temperature, and finally, for 1 hour at 90° C. After having added 1000 cc. of ethanol at 50° C., while stirring, 100 g. of epichlorohydrin were added at 30° C. during 3 hours. Subsequently, a solution of 280 g. of sodium thiosulfate in 250 cc. of water was added. The benzene (as an azeotropic mixture with ethanol and water) was distilled off, while stirring, until an internal temperature of 90° C. was reached. Stirring was continued at 90° C. until the mixture was clearly soluble in water. There were obtained 2.21 g. of an aqueous-alcoholic solution of "Bunte"-salt which had a content of solid matter of about 22% by weight.

20 cc. of an aqueous solution of 10% strength of sodium sulfide were added to 100 cc. of the above solution and the whole was stirred during 20 minutes at room temperature. After squeezing, washing, and drying, there was obtained a resilient rather hard plastic.

*Example 9*

146 g. of triethylene-tetramine (1 mol) together with a mixture of 299 g. of dimerized oleic acid methyl ester (½ mol) and 100 g. of cyclohexane-1,4-dicarboxylic acid dimethyl ester (½ mol) were heated to 140–200° C. until about 64 g. of methanol had separated. The polyamide was then dissolved in a mixture of 1000 cc. of ethanol and 200 cc. of water and 184 g. of epichlorohydrin were added during 1½ hours at 30° C. Stirring was continued for 2 hours at 30° C. and for 1 hour at 50° C., and a solution of 550 g. of sodium thiosulfate in 500 cc. of water was added. The mixture was again stirred for 3–4 hours at 60° C., whereupon it was clearly soluble in water. The ethanol was removed by distillation. The residue was adjusted with water to a content of 40% by weight (yield: 2.2 l.).

To 100 g. of the solution thus prepared were added 20 cc. of an aqueous solution of 5% strength of sodium sulfide. After decanting, washing and drying, there was obtained an insoluble elastic plastic.

We claim:

1. A process for preparing insoluble, resinous, polysulfide cross-linked polycondensation products which comprises condensing (A) a member selected from the group consisting of saturated aliphatic, aromatic, and cycloaliphatic dicarboxylic acids having a molecular weight of from 146 to 650, and the esters, anhydrides, and dihalides thereof, with (B) a polyalkylene polyamine of the formula

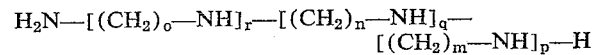

wherein $n$, $m$, and $o$ are each an integer from 1 to 4, $p$ is an integer from 1 to 6, and $q$ and $r$ are each an integer from 0 to 6, the sum of $p$, $q$, and $r$ being at least 2, to form a basic polyamide, substituting at least 3 hydrogen atoms present on nitrogen atoms of said basic polyamide by radicals containing an interchangeable halogen atom and of a formula selected from the group consisting of

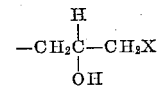

and

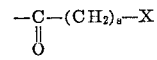

wherein X is a halogen atom and $s$ is an integer from 1 to 3, by reacting said polyamide with a member selected from the group consisting of epihalohydrins, dihalohydrins, and α-, β-, and γ-halogeno-carboxylic acid halides, contacting the substituted compound thus obtained with an inorganic water soluble thiosulfate in aqueous solution at a temperature of from 40° to 100° C., whereby said halogen atoms are replaced by thiosulfate groups to form an organic polythiosulfate, and then cross-linking said organic polythiosulfate by heating with an alkaline condensation agent at a temperature of from 0° to 130° C.

2. The process as in claim 1 wherein the mol ratio of member (A) to polyamine (B) is between 1.8:1 and 1:2.

3. A process as in claim 1 wherein from 3 to 50 of said radicals containing a halogen atom are substituted per molecule of basic polyamide.

4. A process as in claim 1 wherein said alkyl polythiosulfate is treated with said alkaline condensation agent at a temperature of from 40° to 110° C. and at a pH of from 8 to 14.

5. A process as in claim 1 wherein said alkyl polythiosulfate is treated with said alkaline condensation agent in the presence of an accelerator for the condensation, said accelerator being selected from the group consisting of alkali metal sulfites and alkali metal dithionates.

6. Insoluble resinous, polysulfide cross-linked polycondensation polymers prepared by the process defined in claim 1.

References Cited by the Examiner

UNITED STATES PATENTS

| 2,430,859 | 11/47 | Cairns | 260—78 |
| 2,462,430 | 2/49 | Schneider | 260—78 |
| 2,478,038 | 8/49 | Burke | 260—78 |
| 2,926,154 | 2/60 | Kein | 260—78 |
| 3,054,781 | 9/62 | Tsou | 260—79 |

FOREIGN PATENTS 928,733  6/55  Germany.

WILLIAM H. SHORT, *Primary Examiner.*

JOSEPH R. LIBERMAN, *Examiner.*